United States Patent
Wright

[15] 3,642,031
[45] Feb. 15, 1972

[54] FLOW CONTROL DEVICE
[72] Inventor: Allen C. Wright, Moraga, Calif.
[73] Assignee: Haws Drinking Faucet Company, Berkeley, Calif.
[22] Filed: Jan. 22, 1970
[21] Appl. No.: 5,034

[52] U.S. Cl............................138/45, 181/33 S, 239/24
[51] Int. Cl..........................................................F15d 1/02
[58] Field of Search............................138/26, 40, 43, 45, 46; 181/33 S, 36 A, 50, 71; 239/24

[56] References Cited

UNITED STATES PATENTS

| | | | |
|---|---|---|---|
| 1,406,943 | 2/1922 | Doulton et al. | 181/33 S UX |
| 1,901,633 | 3/1933 | Clemmons | 181/33 S UX |
| 2,169,359 | 8/1939 | Jones et al. | 181/33 S UX |
| 2,764,183 | 9/1956 | Gollehon | 138/45 |
| 2,781,058 | 2/1957 | Warhus | 138/45 |

OTHER PUBLICATIONS 1,052,917, German Printed Application 3–1959, Stahli

*Primary Examiner*—Edward J. Earls
*Attorney*—Joseph B. Gardner

[57] ABSTRACT

A flow control device for use with a drinking fountain or the like to maintain the volumetric flow of water thereto relatively independent of supply line pressure and to prevent surging of the water discharge from the fountain. The flow control device is disposed in the water supply conduit to the fountain, and it takes the form of a casing providing a relatively large chamber having inlet and outlet openings adjacent the opposite ends thereof. A pressure-responsive, volumetric-flow regulator is located at the chamber inlet to maintain the flow volume thereto relatively independent of supply line pressure. A turbulence-reducing means in the form of a cellular body of nonabsorbent, form-retaining material located within the chamber has open cellular interstices interconnected one with another to define myriad random flow paths through the body which tend to guide the water along smooth flow paths leading to the outlet opening of the device. In addition to preventing surging of a relatively uniform flow volume, the device also markedly reduces the noise level from that of conventional flow regulators.

7 Claims, 7 Drawing Figures

PATENTED FEB 15 1972　　　　　　　　　　　　　　3,642,031

INVENTOR:
ALLEN C. WRIGHT
BY: Joseph B. Gardner
ATTORNEY

FLOW CONTROL DEVICE

This invention relates generally to liquid-receiving appliances such as drinking fountains and the like and, more particularly, to a flow control device for controlling the supply of liquid to such appliance.

Drinking fountains and similar appliances are generally manufactured without reference to any of the various localities or geographic areas in which they may be used, and such standardization of the appliances presents some problems with their use because the supply line pressures in different localities vary considerably, thereby making it difficult to predict the character of the water discharge to be expected from the appliance. As a consequence, it is customary practice to associate with each appliance some type of pressure or flow regulator that controls the supply of water delivered to the appliance so that it tends to be relatively uniform irrespective of the supply line pressure which generally varies from about 15 to 125 p.s.i.g. in accordance with the particular locality at which the appliance is used.

The usual flow regulator is characterized by producing considerable noise which is believed to be caused by various energy losses within the regulator which appear as the result of the conversion of kinetic energy into sound energy. Also, surging of the water discharge is an undesirable occurrence in drinking fountains and similar appliances, and where present it appears whenever the control valve is first opened to initiate the water discharge. Surging, in the case of the usual flow regulator which effects its control function in response to supply line pressure, is caused by the slight time delay (ordinarily a fractional part of a second) between the instant that flow commences through the regulator and the time required for the regulator to respond to the pressure so as to restrict the flow in proportion to the magnitude thereof. It will be apparent that such surging of water from the nozzle of a drinking fountain or the like is inconvenient and undesirable, as is the development of noise in the flow regulators.

In view of the foregoing, an object of the present invention is to provide an improved flow control device for use with drinking fountains and like appliances and mechanisms.

Another object of the invention is in the provision of an improved antisurge flow control device adapted for interposition in the supply conduit of a drinking fountain or the like and operative when so interposed to substantially eliminate or materially reduce surging of the water discharge from the nozzle thereof.

Still another object is that of providing a flow control device of the character described having a flow regulator located at the inlet thereof so as to provide a relative uniform flow volume discharging from the device over a relatively large range of pressures at which liquid may be supplied thereto.

A further object is to provide an improved flow control device of the type described that is relatively quiet in its operation and significantly reduces the noise level from that of conventional flow control devices.

Additional objects and advantages of the invention, particularly as concerns specific features and details thereof, will become apparent as the specification continues.

An embodiment of the invention is illustrated in the accompanying drawing, in which.

Figure 1:
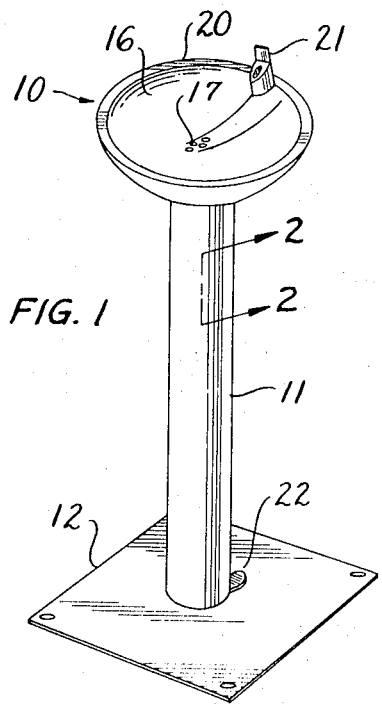
FIG. 1 is a perspective view of a drinking fountain in which a device embodying the invention is incorporated.
Figure 2:
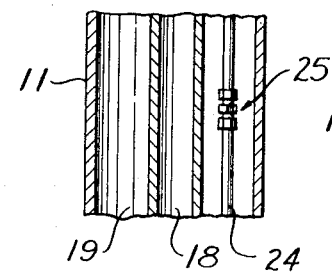
FIG. 2 is an enlarged, broken sectional view taken along the lines 2—2 of FIG. 1.

The drinking fountain illustrated in FIG. 1 is intended to be exemplary and depicts a flow control device embodying the invention in a typical environmental setting therefor. The fountain is denoted in its entirety with the numeral 10, and it includes an upwardly extending pedestal 11 of cylindrical configuration equipped at its lower end with a mounting plate 12 adapted to be secured by a plurality of screws or fasteners located at the corners thereof to a suitable surface which may be an outdoor surface such as a patio, sidewalk or other walkway, or to indoor flooring of any appropriate type. At its upper end, the pedestal 11 has a bowl or receiver 16 connected thereto and supported thereby.

The bowl 16 has the usual concave shape, and it is provided centrally with a plurality of drain openings or ports 17 that communicate with a waste conduit 18 disposed centrally within the hollow interior 19 of the pedestal 11. The waste conduit 18 extends downwardly through the pedestal 11 to a location beneath the mounting plate 12, and it is connected therebelow to the usual waste or sewage system (not shown).

Secured to the bowl 16 along the rim 20 thereof is a nozzle 21 through which water is ejected by appropriate manipulation of a valve (not shown) located beneath the plate 12. Such valve is manipulated between the on and off positions thereof by any suitable control means which, in the form shown, constitutes a foot pedal or lever 22 connected with the valve through a linkage assemblage concealed within the hollow interior 19 of the pedestal 11. A supply line 24 having such valve therein connects the nozzle or outlet 21 with a source of pressurized water (or any other liquid), and such supply line is located within the hollow interior 19 of the pedestal 11.

Disposed along the supply conduit 24 in general proximity to the outlet or discharge nozzle 21 is an antisurge flow control device 25 through which all water delivered to the discharge nozzle 21 must pass. The flow control device 25 includes a casing 26 in the form of a nipple having a generally cylindrical sidewall and externally threaded ends 27 and 28 adapted to be connected to fittings provided for this purpose along the supply conduit 24. The casing 26 defines a chamber 29 therein which essentially constitutes a straight line flow passage therethrough.

The casing 26 and chamber 29 thereof are provided with an inlet and with an outlet generally located at the ends of the chamber 29 and respectively identified with the numerals 30 and 31. In the particular form shown, the outlet 31 has essentially the same diameter as that of the chamber 29, but the inlet 30 is slightly enlarged so as to provide a pressure chamber or pressurizable space 32 adapted to be coaxially circumjacent a flow regulator 34 having an end portion thereof located within the pressurizable space 32.

The flow regulator 34 is pressure-responsive volumetric-flow regulator operative to maintain the volumetric flow issuing from the outlet 31 relatively independent of supply pressures over a substantial range thereof which, for example, is usually within the range of about 15 to 125 p.s.i.g. when the liquid being delivered to the device 25 is from a municipal water supply. The regulator 34 is formed of a resilient compressible material such as rubber, either natural or synthetic, and it is provided centrally therethrough with an axially extending flow passage 35 of restricted cross section relative to the cross-sectional area of the chamber 29 with which it communicates. Liquid delivered to the regulator 34 moves in the direction of the arrow in FIG. 6, and the inlet end of the regulator passage 35 may be relieved or tappered slightly as shown at 36 so as to reduce friction and turbulence of the liquid flowing therethrough.

Figure 6:
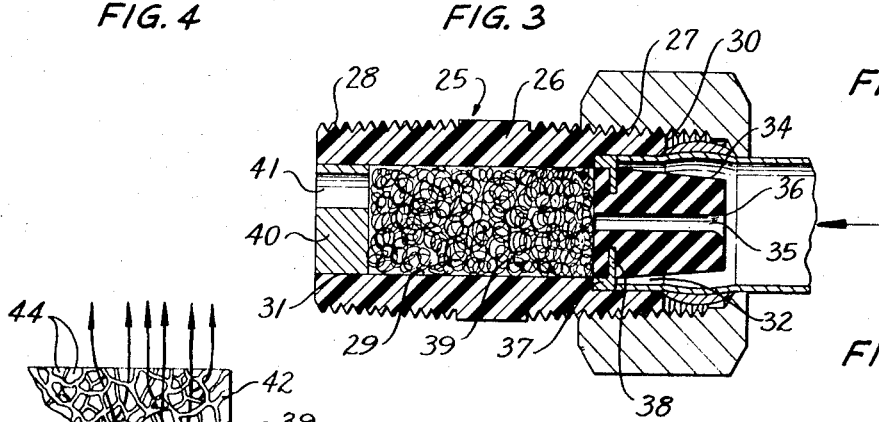
FIG. 6 is a longitudinal sectional view taken along the line 6—6 of FIG. 5.

The regulator 34 has a smaller outer diameter than that of the pressurizable space 32, and it has a frustoconical configuration enlarging from the inlet end thereof toward the discharge end located within the space 32. The regulator is held within the space 32 by a relatively snug friction fit so as to prevent it from being displaced from its position by gravity, jarring, or some other inadvertance, but it should be observed that the pressure of the liquid being supplied to the device 25 tends to urge the regulator 34 into the space 32 and to maintain it to the proper position thereof which is shown in FIG. 6. However, as explained in greater detail hereinafter, it is necessary that a pressure be developed within the space 32 in order for the regulator 34 to function properly, and a relatively tight fit and resulting good seal is intended about the regulator 34 at the inner base end thereof. Retention of the regulator and the desired seal are effected in the device 25 being considered by an annular ring 37 formed of metal or other relatively rigid material having an outer diameter approximating that of the space 32 so as to tightly engage the walls thereof, and having also an inwardly projecting annular flange 38 that extends into a recess or channel provided therefor by the regulator 34 so as to be constrained thereon.

Figure 4:
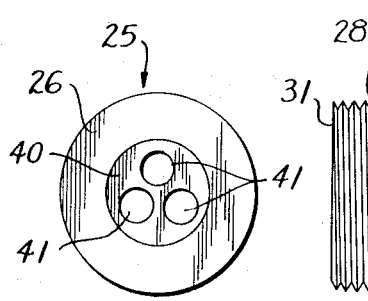
FIG. 4 is an end view in elevation of the device showing the discharge end thereof.
Figure 3:
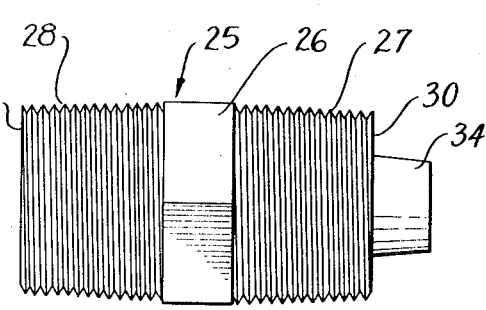
FIG. 3 is a greatly enlarged side view in elevation of the device.
Figure 5:
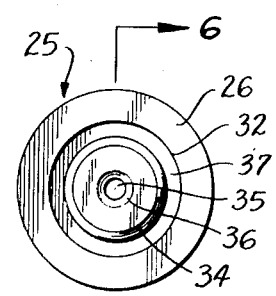
FIG. 5 is an end view in elevation of the inlet end of the device.

Located within the chamber 29 are means for damping the initial flow of liquid thereinto and for reducing the turbulence of liquid flowing therethrough. In the device 25, such means comprises a cellular body 39 that substantially fills the chamber 29 so that liquid entering from the inlet 30 must flow through the body in reaching the outlet 31. The body 39 is confined within the chamber 29 by any suitable means which may take the form of a plug or cover 40 that extends across the outlet 31 and is provided with a plurality (three, in the form shown) of apertures 41 thereabout. As shown best in FIG. 4, the apertures 41 are uniformly distributed and are relatively large in the aggregate. The cover 40 may be secured to the casing 26 in any suitable manner, and a press fit has been found quite effective.

The body 39 comprises a fibrous mass having open cellular interstices interconnected one with another to define myriad random flow paths through the body accommodating movement of liquid from the inlet 30 to the outlet 31 for issue from the latter. The body 39 is essentially nonabsorbent and form retaining, although resilient or springy, so that the water moving therethrough has substantially no effect thereon, and the size and orientation of the interstitial spaces therefore remain substantially unaltered by the water or other liquid to which the body is subjected.

Also, the cellular orientation provided by the body is predominantly unidirectional and establishes the direction of such flow paths as being generally between the inlet 30 and outlet 31. This characteristic is depicted particularly in FIG. 7 which illustrates that the body is comprised of a plurality of fibers or solid components 42 defining interstitial spaces 44 which are generally round although instead of being circular, they have generally polygonal configurations. The orientation of the openings 44 along any plane cut through the body 39 substantially parallel to the inlet 30 and outlet 31 is such that the openings lie generally in the plane, or at least sufficiently so that spaces 44 in successive layers generally align with each other to establish flow paths therethrough, as indicated by the arrows in FIG. 7. In this regard, a plurality of spaces 44 in any one layer may align generally and be in flow communication with one or more openings in a preceding layer so that all of the flow paths through the body 39, although generally unidirectional, are of somewhat random orientation and are myriad.

Figure 7:
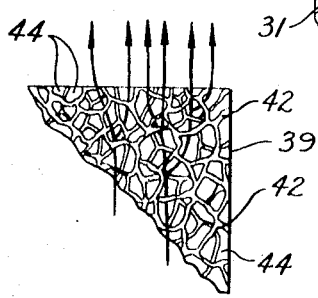
FIG. 7 is a further enlarged fragmentary sectional view of the cellular body forming a part of the flow control device.

Also as shown in FIG. 7, the interstitial spaces 44 within the body 39 occupy a substantially greater volume than that occupied by the fibers or solid components 42 within the body and which fibers define the various spaces 44. Since the body 39 is thick and substantially fills the chamber 18, all of the water moving from the inlet 30 to the outlet 31 must move through the body and is therefore influenced by the components 42, interstitial spaces 44 and myriad flow paths therethrough. The body reduces the pressure and directional velocity of the stream issuing from outlet 31 relative to the pressure and velocity of the water supplied to the inlet 30 by, it is believed, assuring that the water passing through chamber 29 fills the large volume of such chamber even when water under a relatively high pressure is supplied through the inlet 30. In being nonabsorbent and form retaining, the body does not tend to expand because of its exposure to water and it does not become filled and clogged therewith.

Several materials having the characteristics described may be used to provide the body 39, and an example thereof is an open cell, polyurethane polyester foam. The cells or pores or interstitial spaces within such material are formed during the process by which the foam is prepared, and as respects the present invention the technique used for such formation may be conventional. A more particular example of a suitable substance is Scott Industrial Foam which is a product made by the Foam Division of the Scott Paper Company. Such product has a porosity of about 20 cells or spaces per lineal inch in all directions, and the average pore (the sizes vary considerably and the pores are generally polygonal rather than circular and have maximum and minimum dimensions) has a maximum diameter of about 3/64 of an inch.

The casing 26 defining the nipple may be formed of various materials, but usually a dielectric material such as one of the plastics conventionally used for this purpose is advantageous because it avoids the occurrence of electrolysis in the flow system, and it also helps to reduce noise in that sound transmission through such a material is much less than that through a metallic substance such as steel or brass. As respects noise development, it has been found that the device 25 reduces the noise level by as much as 60 to 80 percent from the level of noise created by conventional flow controllers. The reasons for such reduction in the noise level may be several and varied, but it is theorized that the reduction in turbulence of the liquids flowing through the device is a factor of significance. In this reference, the body of material 39 tends to guide the liquid through and along relatively smooth paths defined by the interconnected spaces 44, thereby tending to enforce upon the liquid a laminar flow in contradistinction to a turbulent flow which results in a portion of the kinetic energy present in the flowing liquid to be dissipated as noise.

As indicated hereinbefore, the flow regulator 34 has the characteristic of providing a relatively uniform flow volume over a wide pressure range so that the liquid entering the chamber 39 from the regulator 34 is at a relatively constant rate (i.e., volume per unit of time) irrespective of the supply pressure. The regulatory function of the regulator 34 is best understood by referring to FIG. 6 which illustrates that the conduit section 24 connected with the threaded ends 27 of the casing supplies liquid at line pressure to the space 32 surrounding the inner end of the regulator at the same time that it supplies liquid to the passage 35 extending through the center portion of the regulator. The pressure fluid within the space 32 acts radially inwardly against the external surface of the regulator 34, thereby deforming it inwardly so as to restrict the opening through the passage 35.

Quite evidently, as the supply pressure increases, the pressure force compressing the regulator 34 increases with the result that the opening through the passage 35 is further restricted so as to reduce the volumetric flow therethrough. Conversely, a reduced pressure within the space 32 will permit the inherent resilience of the regulator 34 to restore it toward its undistorted position in which the opening through the passage 35 is larger, thereby permitting more liquid to flow therethrough. Accordingly, the passage 35 is restricted as the supply pressure increases and is permitted to open as the supply pressure decreases, and its regulatory function is so established that the flow into the chamber 29 is relatively uniform over a substantial wide pressure range. As a specific example, in one embodiment of the device 25 in which the casing 26 is essentially a three-eighths nipple and has a length of 1¼ inches, an outer diameter of eleven-sixteenths of an inch, and a chamber 29 with a diameter of three-eighths of an inch, the regulator 34 associated therewith provides a volumetric flow of about 0.7 at 1.0 gallons per minute over the pressure range heretofore stated.

The device 25 also eliminates or substantially reduces surging of the liquid delivered through the outlet 31 thereof, and it is believed that the controlled flow rate of liquid into the chamber 29 in association with the large size and capacity thereof relative to the inlet passage 35 together with the body of material 39 within such chamber provide this advantageous result both in environments in which the chamber 29 tends to remain filled with liquid following interruption of the flow of liquid therethrough and in environments in which the chamber is essentially drained of liquid after each use such as in the case of a freezeproof drinking fountain in which the supply conduit 24 is substantially drained of water following each use so as to avoid the consequence of water freezing therein, all is explained in my copending patent application Ser. No. 832,928, filed June 13, 1969 now U.S. Pat. No. 3,565,338.

Concerning antisurging and the body of material 39, during the initial instant of flow through the passage 35 of the regulator 34 the passage is unrestricted because no significant pressure force is present within the pressurizible space 32 since the device 25 is located downstream of the control valve in the supply line 24, thereby making the space 32 at this time very close to atmospheric pressure. Accordingly, an inordinately large volume of liquid will initially issue from the passage 35 and would result in a surge of liquid from the nozzle 21. However, in the device 25 such surging does not occur, and it is believed that the cellular body 39 is compressed by the high-pressure, high-velocity discharge of liquid thereagainst which compression of the body retards the issue of liquid through the outlet 31 and causes the excess energy therein to be dissipated in spreading throughout the chamber 29. Thus, the body 39 dampens the liquid flow.

While in the foregoing specification and embodiment of the invention has been set forth in considerable detail for purposes of making a complete disclosure thereof, it will be apparent to those skilled in the art that numerous changes may be made in such details without departing from the spirit and principles of the invention.

What is claimed is:

1. A flow control device of the character described for use in a supply conduit delivering liquid to a drinking fountain or the like, comprising: a casing adapted to be interposed in such supply conduit and having spaced apart inlet and outlet openings and defining a chamber therebetween; a flow regulator connected with said inlet opening and providing an inlet aperture communicating with said chamber and through which all liquid is delivered thereto, said inlet aperture being of small cross-sectional area relative both to said chamber and to said outlet opening, and said flow regulator being resilient and compressible and pressure deformable to change the cross-sectional area of said inlet aperture in inverse proportion to the magnitude of the supply pressure so as to maintain automatically the volumetric flow issuing from said outlet opening relatively uniform irrespective of the contemporary value of the supply pressure over a substantial range thereof; and a fibrous mass having open cellular interstices within said chamber for damping the initial flow of liquid therethrough from said inlet to said outlet.

2. The device of claim 1 and further comprising a cover extending across said outlet and being provided with a plurality of apertures thereabout through which the liquid flow emerges.

3. The device of claim 1 in which said chamber is longitudinally elongated and is for the most part of substantially uniform diameter, said fibrous mass substantially filling said chamber.

4. The device of claim 1 in which said casing is a nipple equipped adjacent the opposite end portions thereof with threads by means of which said casing is connected with a supply conduit.

5. The device of claim 1 and further comprising a cover extending across said outlet and being provided with a plurality of apertures thereabout through which the liquid flow emerges, and in which said chamber is longitudinally elongated and is for the most part of substantially uniform diameter, said fibrous mass substantially filling said chamber.

6. The device of claim 5 in which said fibrous mass is resilient and compressible and is essentially nonabsorbent and form retaining so that the size and orientation of the interstitial spaces remains substantially unaltered by being subjected to the movement of liquid through said body.

7. The device of claim 6 in which said casing is a nipple equipped adjacent the opposite end portions thereof with threads by means of which said casing is connected with a supply conduit.

* * * * *